United States Patent
Paikin et al.

(10) Patent No.: US 11,847,189 B2
(45) Date of Patent: Dec. 19, 2023

(54) FUSING FBIS AND DVS DATA STREAMS USING A NEURAL NETWORK

(71) Applicant: SAMSUNG ELECTRONICS CO., LTD., Suwon-si (KR)

(72) Inventors: Genady Paikin, Netanya (IL); Yotam Ater, Petah Tikva (IL); Evgeny Soloveichik, Netanya (IL)

(73) Assignee: SAMSUNG ELECTRONICS CO, LTD., Suwon-si (KR)

( * ) Notice: Subject to any disclaimer, the term of this patent is extended or adjusted under 35 U.S.C. 154(b) by 362 days.

(21) Appl. No.: 17/097,845

(22) Filed: Nov. 13, 2020

(65) Prior Publication Data

US 2022/0156532 A1     May 19, 2022

(51) Int. Cl.
| | |
|---|---|
| *G06F 18/25* | (2023.01) |
| *G06N 3/08* | (2023.01) |
| *G06N 3/04* | (2023.01) |
| *G06F 18/21* | (2023.01) |
| *G06F 1/18* | (2006.01) |

(52) U.S. Cl.
CPC ................. *G06F 1/18* (2013.01); *G06F 18/21* (2023.01); *G06N 3/04* (2013.01); *G06N 3/08* (2013.01)

(58) Field of Classification Search
CPC .......... G06F 18/25; G06F 18/21; G06N 3/04; G06N 3/08; G06N 3/045; G06N 5/04; G06V 10/12; G06V 10/82; G06V 10/803; H04N 25/57; H04N 25/60; H04N 25/75
See application file for complete search history.

(56) References Cited

U.S. PATENT DOCUMENTS

2021/0105421 A1 *    4/2021   Kukreja ................. G06N 3/063

OTHER PUBLICATIONS

High Speed and High Dynamic Range Video with an Event Camera.
Fast Image Reconstruction with an Event Camera.
EventSR: From Asynchronous Events to Image Reconstruction, Restoration, and Super-Resolution via End-to-End Adversarial Learning.
Bringing a Blurry Frame Alive at High Frame-Rate with an Event Camera.
Learning to Super Resolve Intensity Images from Events.
Learning Event-Based Motion Deblurring.

* cited by examiner

*Primary Examiner* — Jianxun Yang
(74) *Attorney, Agent, or Firm* — F. CHAU & ASSOCIATES, LLC

(57) ABSTRACT

A method of fusing frame based image sensors (FBIS) images with dynamic vision sensor (DVS) event data includes concatenating a plurality of image tensors into a single image input tensor; concatenating a plurality of event tensors into a single event input tensor; concatenating the event input tensor and the image input tensor wherein a single input tensor containing data from both the image input tensor and the event input tensor is generated; processing the single input tensor with a fully convolutional neural network (FCNN), wherein in a contracting path of the FCNN, a number of channels is increased, and in an expansion path of the FCNN, the number of channels is decreased; and combining channels wherein an output image tensor is generated with a reduced number of channels.

20 Claims, 19 Drawing Sheets

FBIS Input Tensor

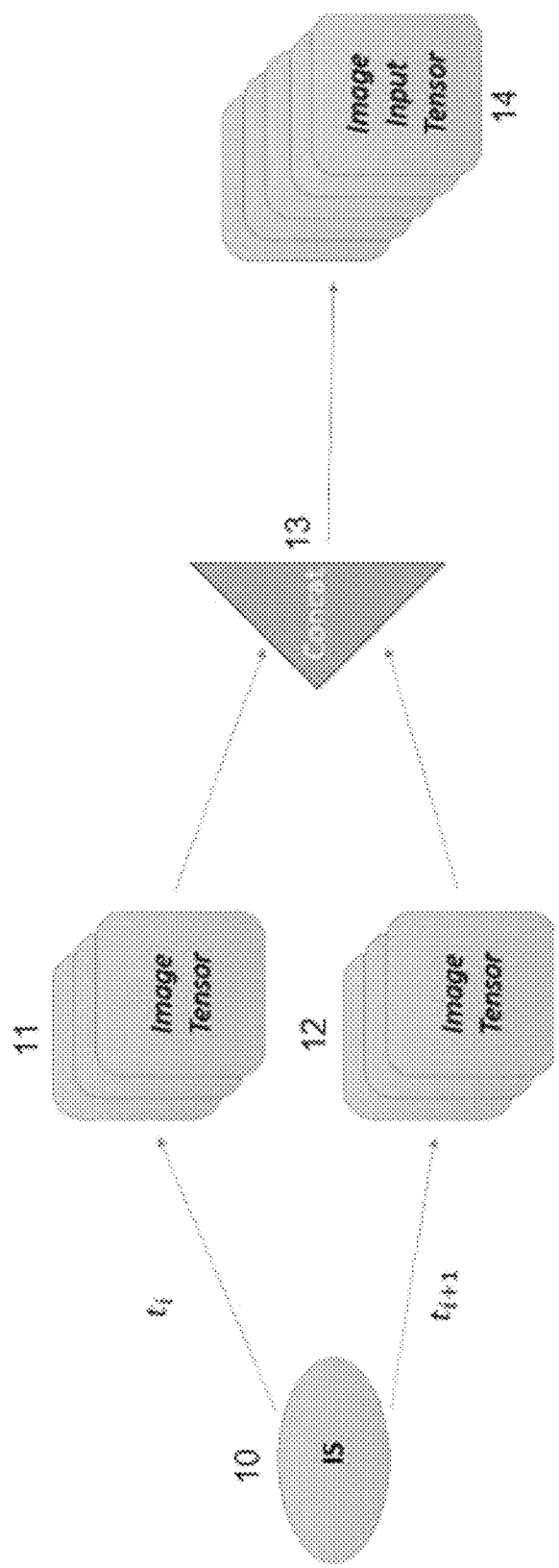
FIG. 1 – FBIS Input Tensor

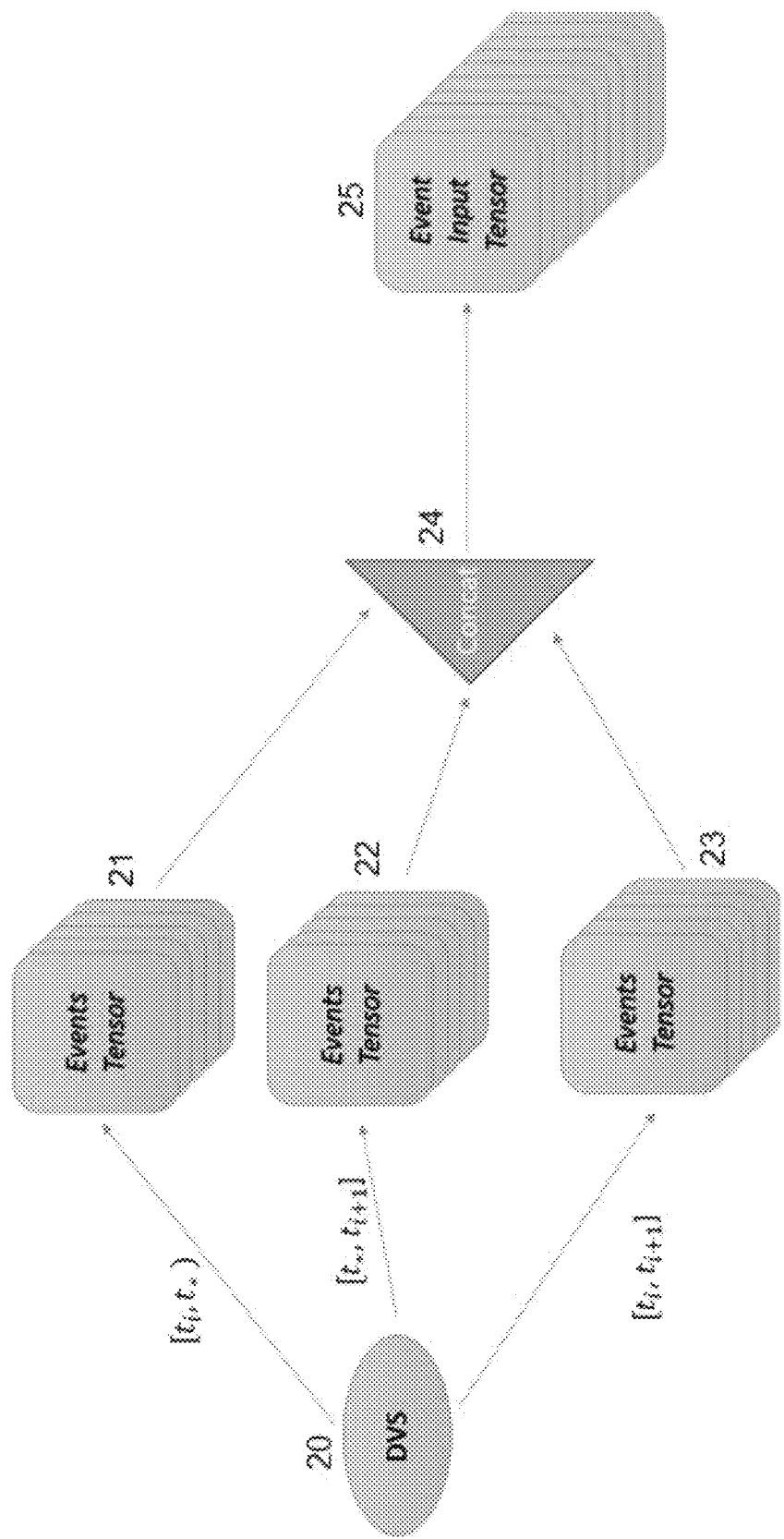
FIG. 2 – DVS Input Tensor

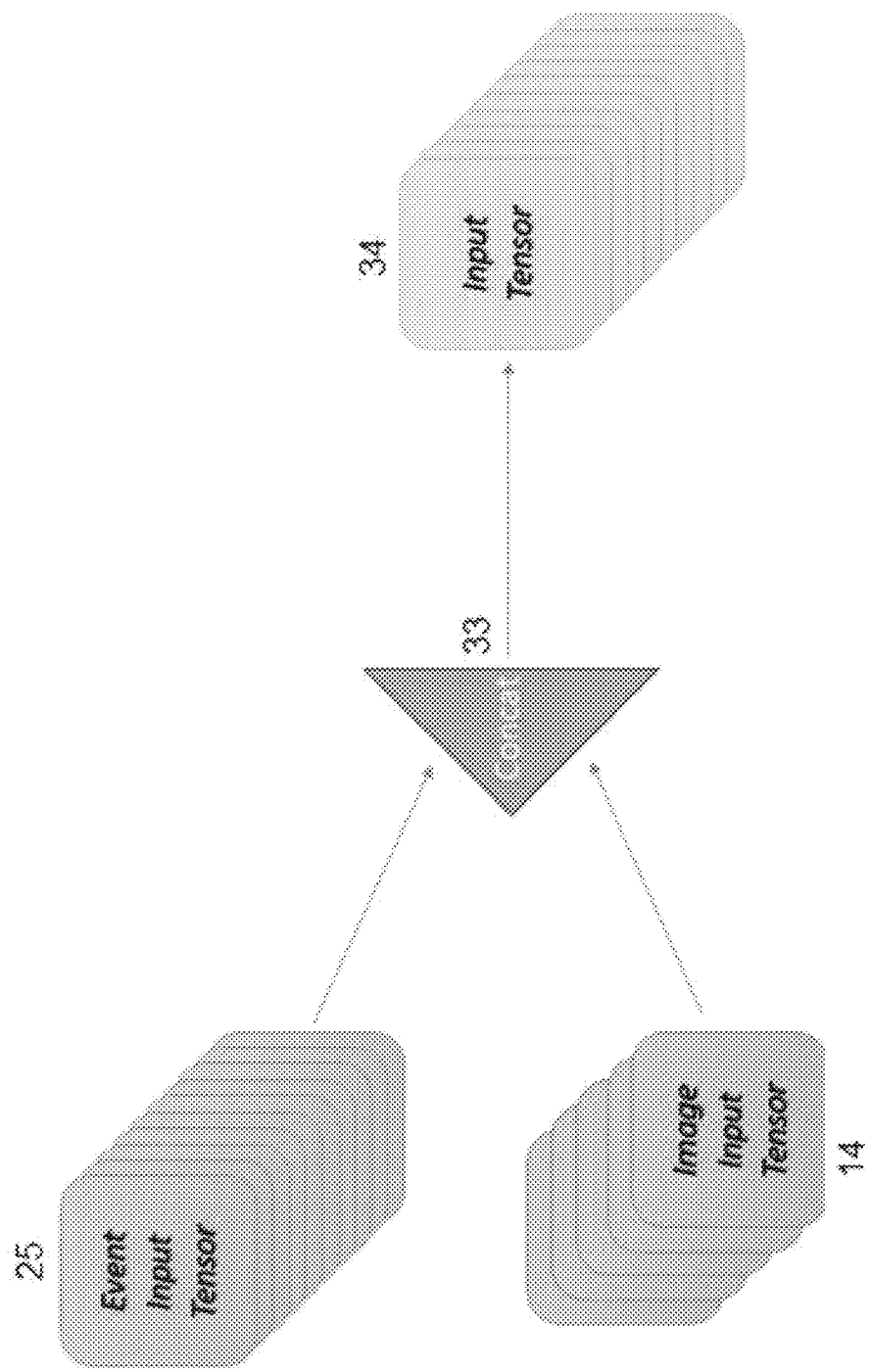
FIG. 3 – Naïve Input Pre-Fusion

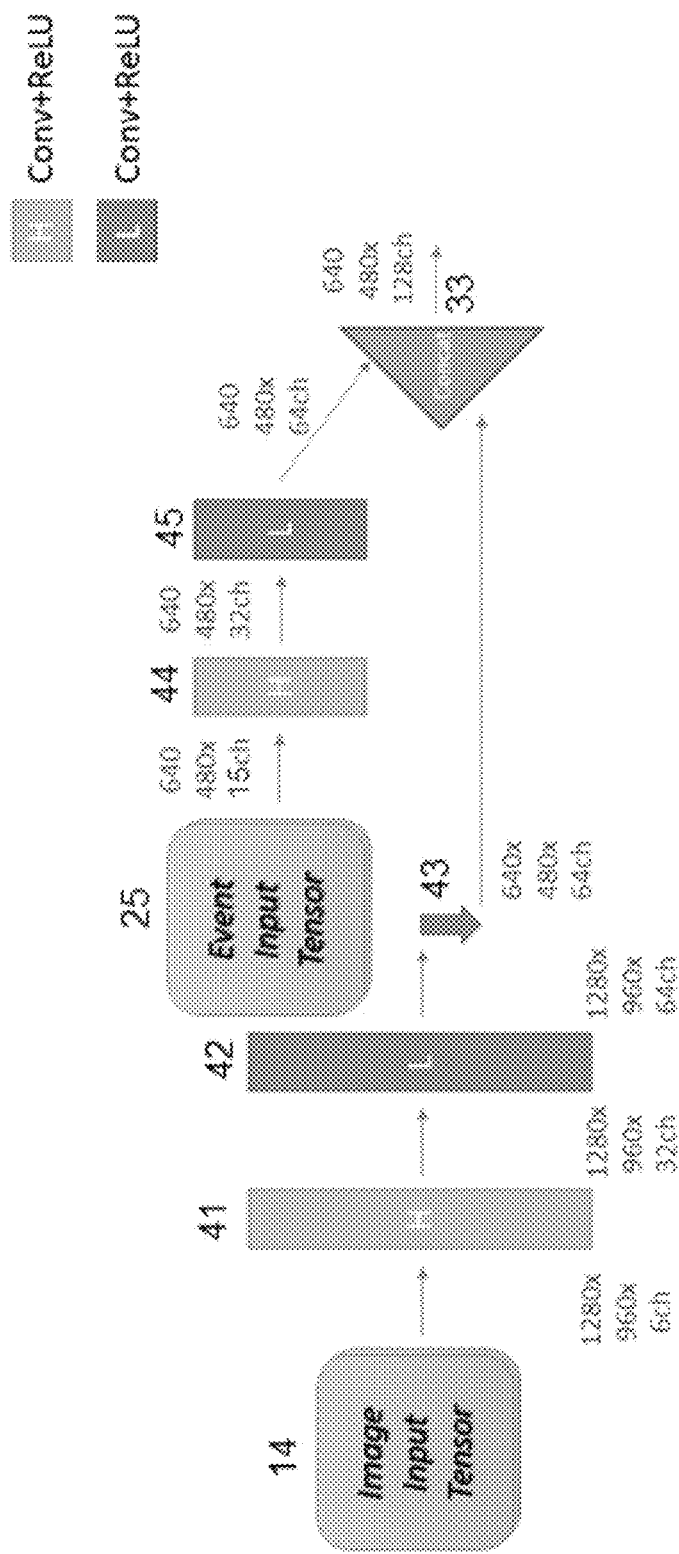
FIG. 4 – Example of Pre-Fusion of Sensors with Different Dimension

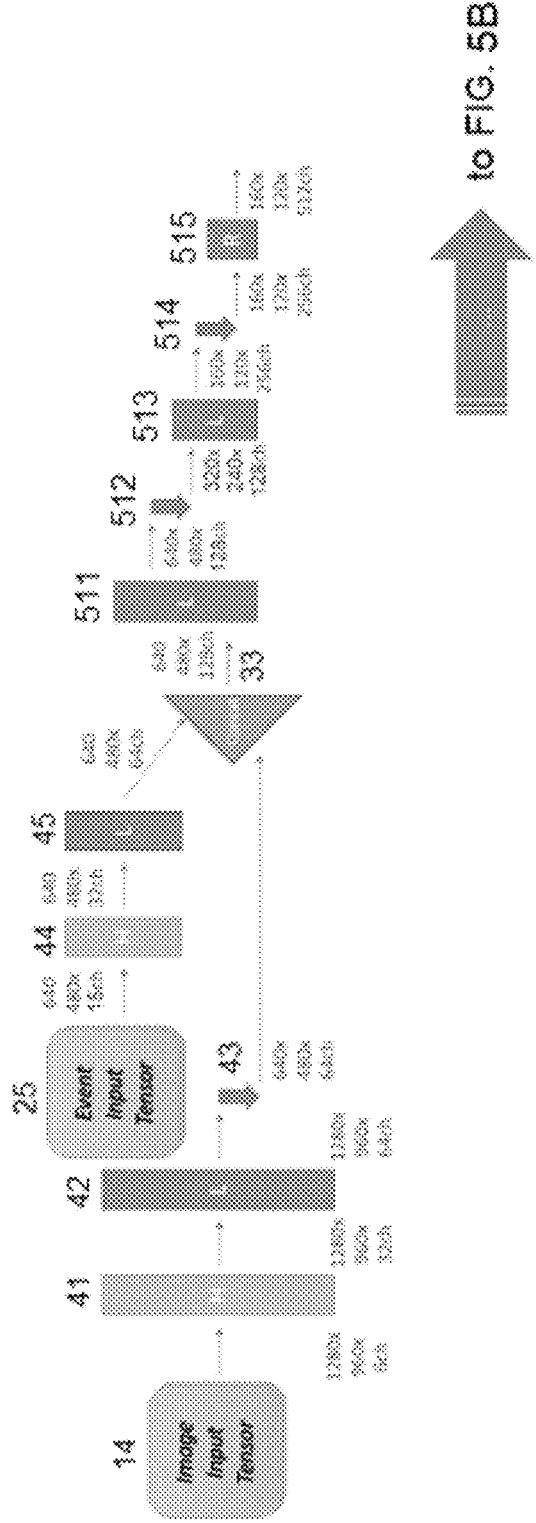
FIG. 5A – EFINet Contracting Path

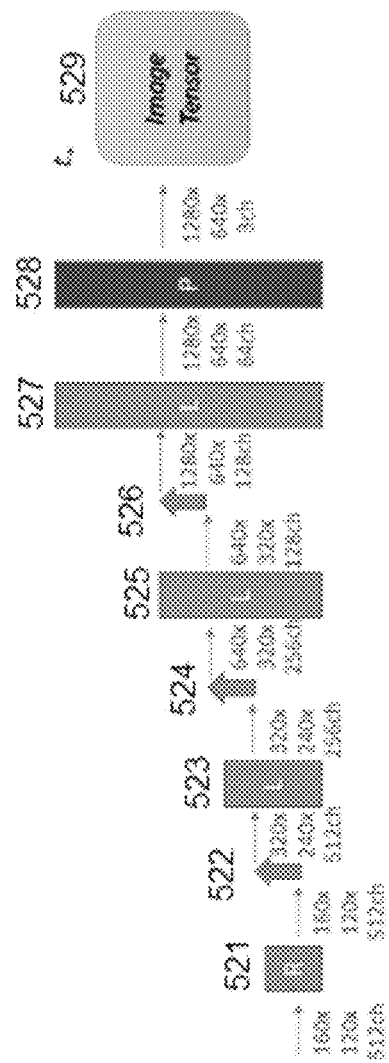
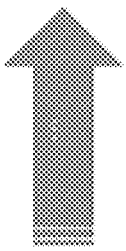
FIG. 5B- EFINet Expansive Path

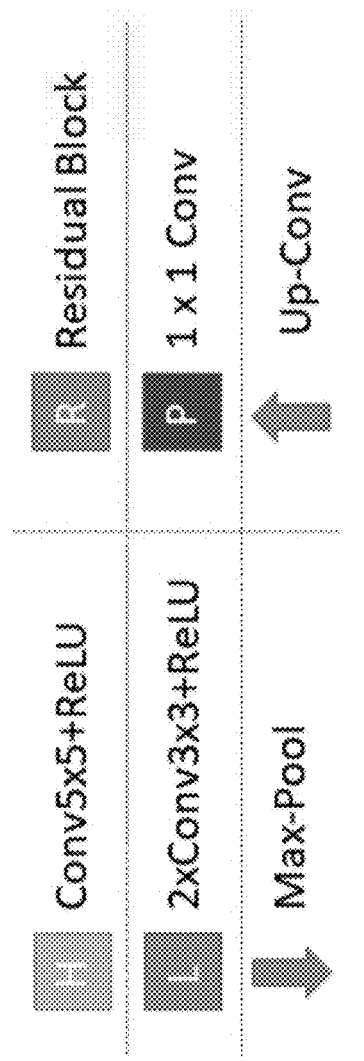
FIG. 6 — EFINet Legend

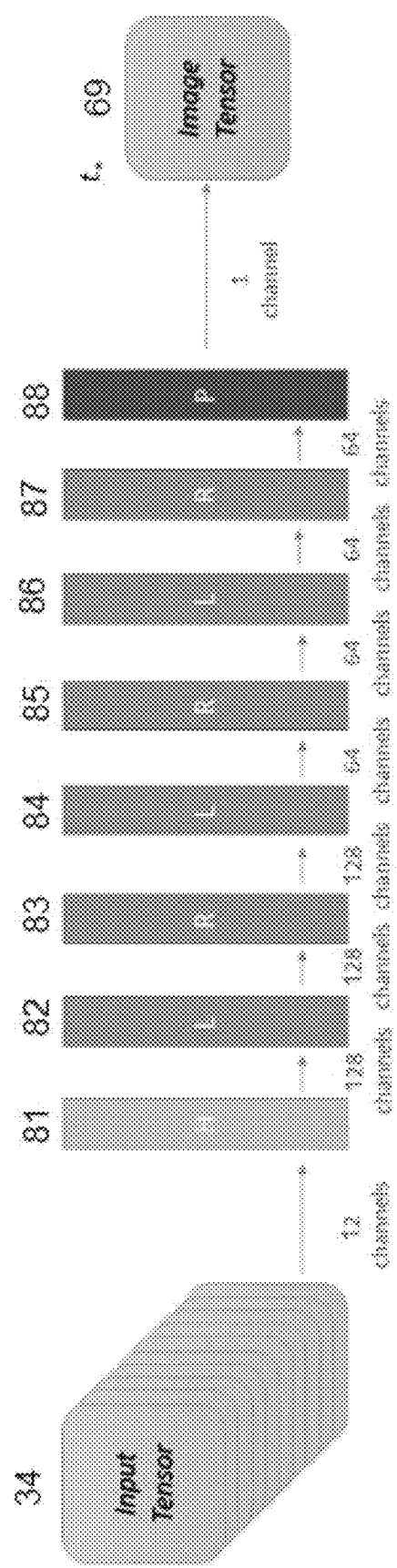
FIG. 8 – Lite EFINet

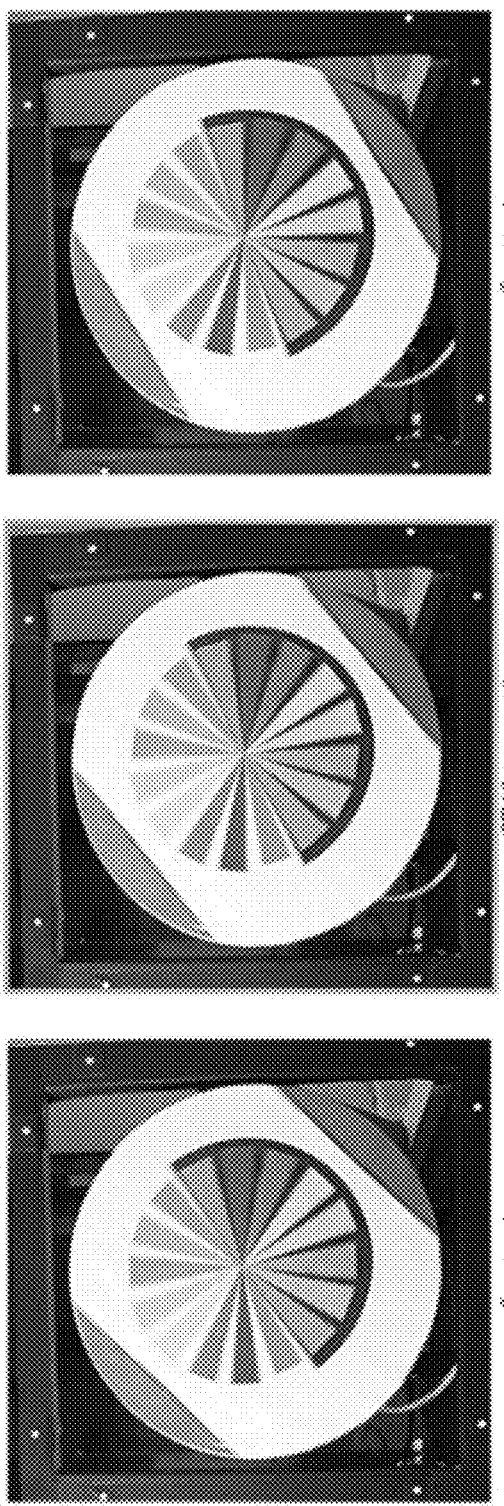
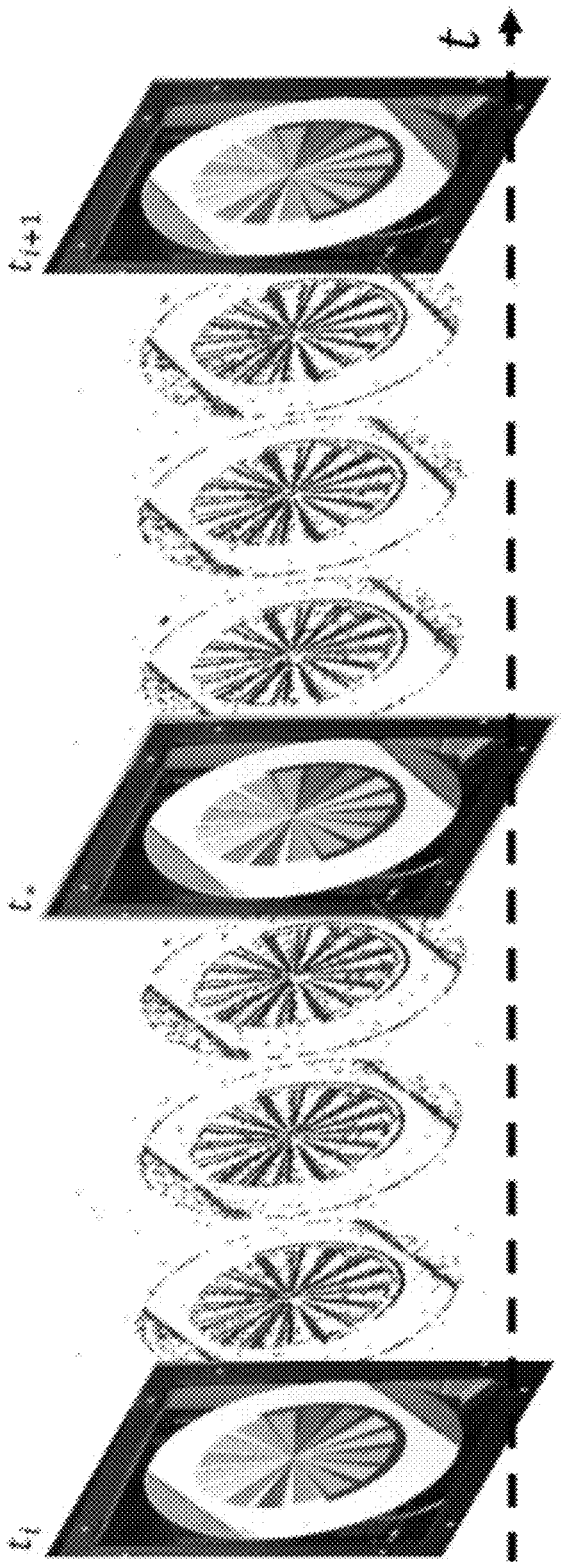
FIG. 11

FUSING FBIS AND DVS DATA STREAMS USING A NEURAL NETWORK

BACKGROUND

Technical Field

Embodiments of the present disclosure are directed to the technical field of computer vision and image/video processing. More particularly, embodiments of the present disclosure are directed to frame rate up conversion and image deblurring.

Discussion of the Related Art

A frame based image sensor (FBIS) is a solid-state device that captures light and converts it into an image. Image sensors are built into many of today's devices, including mobile phones, digital cameras, medical imaging equipment and other devices that mostly use either a CCD (charge coupled device) or CMOS (Complementary Metal Oxide Semiconductor) technology.

A dynamic vision sensor (DVS) is an imaging sensor that responds to local changes in brightness, and is also known as an event camera. A DVS does not capture images using a shutter as a conventional cameras does. Instead, each pixel inside a DVS operates independently and asynchronously, recording changes in brightness as they occur, and doing nothing otherwise. Modern DVSs have microsecond temporal resolution, and are thus less susceptible to motion blur artifacts and provide high temporal resolution data about the scene. The DVS sensor does not create images; instead it asynchronously sends "events" from each pixel when the illumination changes for that pixel. The polarity of the event indicates whether the pixel sensed an increase in illumination, which is an up polarity, or a decrease in illumination, which is a down polarity.

Frame rate up conversion is based on video frame interpolation, which is the synthesis of non-existent frames between samples of original input frames. Conventional approaches for video frame interpolation are prone to various artifacts, such as halos, ghosting and break-ups. Inclusion of high-temporal resolution DVS data into the FRC process aids in reducing these artifacts.

SUMMARY

Embodiments of the disclosure provide a full fusion pipeline between color images from a frame based image sensor (FBIS) and an event stream from a dynamic vision sensor (DVS). Embodiments of the disclosure can overcome interpolation and deblurring artifacts and produce high frame rate colorful natural looking frames for still images and videos. Embodiments of the disclosure can also overcome spatial resolution and temporal resolution disparity between FBIS and DVS sensors.

According to an embodiment of the disclosure, there is provided a method of fusing frame based image sensors (FBIS) images with dynamic vision sensor (DVS) event data, comprising the steps of: concatenating a plurality of image tensors, each acquired from a FBIS at a separate time, into a single image input tensor, wherein each image tensor is a 3D tensor, with 2 spatial dimensions and a third dimension that is initially a color dimension; concatenating a plurality of event tensors, each acquired from a DVS at a separate time, into a single event input tensor, where each event tensor is a 3D tensor with 2 spatial dimensions and a third dimension that is initially a temporal dimension; concatenating the event input tensor and the image input tensor wherein a single input tensor containing data from both the image input tensor and the event input tensor is generated; processing the single input tensor with a fully convolutional neural network (FCNN), wherein in a contracting path of the FCNN, a number of channels is increased, and in an expansion path of the FCNN, the number of channels is decreased; and combining channels wherein an output image tensor is generated with a reduced number of channels.

According to a further embodiment of the disclosure, the image tensors are ordered by time in the image input tensor, and wherein the input event tensor is normalized such that the mean and standard deviation of nonzero values in the input event tensor are 0 and 1, respectively.

According to a further embodiment of the disclosure, concatenating the plurality of event input tensors comprises concatenating, for each event time point between consecutive FBIS frames, a first event stream tensor, a second event stream tensor, and a third event stream tensor into an event input tensor, wherein each of the first event stream tensor, the second event stream tensor, and the third event stream tensor is a 3D tensor with 2 spatial dimensions and a third dimension that is initially a temporal dimension.

According to a further embodiment of the disclosure, for an image input tensor that combines a first FBIS frame at time $t_i$ and a second FBIS frame at time $t_{i+1}$, the first event stream tensor for a time point $t_*$ between the first and second FBIS frames includes events acquired in the time range $[t_i, t_*)$, the second event stream tensor for a time point $t_*$ between the first and second FBIS frames includes events acquired in the time range $[t_*, t_{i+1}]$, and the third event stream tensor for a time point $t_*$ between the first and second FBIS frames includes events acquired in the time range $[t_i, t_{i+1}]$, and further comprising using the third event stream for global normalization.

According to a further embodiment of the disclosure, concatenating the event input tensor and the image input tensor into a single input tensor comprises, when the spatial dimensions of the image input tensor differs from the spatial dimensions of the event input tensor: processing the image input tensor in a neural network to increase a number of channels in the third dimension and resampling the spatial dimensions of the image input tensor to match the spatial dimension of the event input tensor wherein a processed image input tensor is generated; processing the event input tensor in a neural network to increase a number of channels in the third dimension to match the number of channels in the third dimension of the image input tensor wherein a processed event input tensor is generated; and concatenating the processed image input tensor and the processed event input tensor into a single input tensor.

According to a further embodiment of the disclosure, processing the single input tensor with a FCNN comprises decreasing a spatial resolution of the single input tensor in a contracting path of the FCNN, and increasing the spatial resolution of the input tensor in an expansion path of the FCNN.

According to a further embodiment of the disclosure, the FCNN includes skip connection between network layers in the contracting path and network layers in the expansion path, and a first convolution layer I each dimension in the contracting path is replaced by a recurrent neural network.

According to a further embodiment of the disclosure, processing the single input tensor with a FCNN includes transforming a color space of a first FBIS image and a second FBIS image from a first color space to a second color space, wherein a first and second luminance image is generated for each input image, and a first and second AB images are generated for each input image, and downsampling each luminance image in each spatial dimension; processing the downsampled first and second luminance images and DVS input samples by a first U-net wherein a first mixed grayscale frame is generated with a same spatial resolution as the downsampled first and second luminance images and the DVS input samples; upsampling the first mixed grayscale frame and the DVS input samples in each spatial dimension and combining the upsampled first mixed grayscale frame and upsampled DVS input samples with the first and second luminance images in a second U-net wherein a second mixed grayscale frame is generated with a same spatial resolution as the upsampled first mixed grayscale frame, the upsampled DVS input samples, and the first and second luminance images; combining the second mixed grayscale frame with the first and second luminance images and the first and second AB images in a third U-Net wherein an output tensor in the second color space is generated; and transforming the color space of the output tensor from the second color space to the first color space.

According to a further embodiment of the disclosure, the FCNN is a U-Net.

According to another embodiment of the disclosure, there is provided a system for fusing frame based image sensors (FBIS) images with dynamic vision sensor (DVS) event data, including a FBIS sensor; a DVS sensor; a read-out and electronic synchronization module that synchronizes images acquired from the FBIS sensor with event data acquired from the DVS sensor so that they have a common reference time; a recording media module that records the outputs of the FBIS and DVS sensors; and an application processor that executes a neural network that is configured to fuse images acquired from the FBIS images with event data acquired from the DVS.

According to a further embodiment of the disclosure, the neural network includes a pre-fusion system that is configured to concatenate a plurality of images acquired from the FBIS at separate times, into a single image input tensor, concatenate, for each event time point between consecutive FBIS frames, a first event stream tensor, a second event stream tensor, and a third event stream tensor into an event input tensor, and fuse the image input tensor and the event input tensor into a single input tensor, and a fully convolutional neural network (FCNN) that processes the single input tensor, wherein in a contracting path of the FCNN, a number of channels is increased, and in an expansion path of the FCNN, the number of channels is decreased, and combines channels wherein the number of channels is reduced to correspond to a number of colors wherein an output image tensor is generated.

According to another embodiment of the disclosure, there is provided non-transitory program storage device readable by a computer, tangibly embodying a program of instructions executed by the computer to perform the method steps for fusing frame based image sensors (FBIS) images with dynamic vision sensor (DVS) event data. The method includes the steps of concatenating an event input tensor formed by concatenating a plurality of event tensors acquired from a DVS at separate times and an image input tensor formed by concatenating a plurality of image tensors acquired from a FBIS at separate times, into a single image input tensor wherein a single input tensor containing data from both the image input tensor and the event input tensor is generated, wherein each image tensor is a 3D tensor with 2 spatial dimensions and a third dimension that is initially a color dimension, wherein the image tensors are ordered by time in the image input tensor, and each event tensor is a 3D tensor with 2 spatial dimensions and a third dimension that is initially a temporal dimension, wherein the input event tensor is normalized such that the mean and standard deviation of nonzero values in the input event tensor are 0 and 1, respectively; and processing the single input tensor with a fully convolutional neural network (FCNN), wherein in a contracting path of the FCNN, a number of channels is increased, and in an expansion path of the FCNN, the number of channels is decreased.

According to a further embodiment of the disclosure, the method includes combining channels wherein an output image tensor is generated with a reduced number of channels.

BRIEF DESCRIPTION OF THE DRAWINGS

FIG. 1 depicts two consecutive FBIS frames being concatenated to into one 6 channel tensor, according to an embodiment of the disclosure.

FIG. 2 shows three FBIS frame tensors being concatenated, according to an embodiment of the disclosure.

FIG. 3 illustrates a naïve prefusion, when the dimension of the sensors are the same, according to an embodiment of the disclosure.

FIG. 4 illustrates a pre-fusion of a 640×480 DVS and a 1280×960 FBIS, according to an embodiment of the disclosure.

FIGS. 5A and 5B illustrate an EFINet example scheme for a 640×480 DVS and a 1280×960 FBIS, according to an embodiment of the disclosure.

FIG. 6 is a legend for the components of FIGS. 4, 5A and 5B, according to an embodiment of the disclosure.

FIG. 8 illustrates an example of a lite EFINet with an input of FIG. 3, according to an embodiment of the disclosure.

FIGS. 11 and 12 display examples of embodiments of the disclosure that operates on a synthetic video sequence.

DETAILED DESCRIPTION

Figure 7:
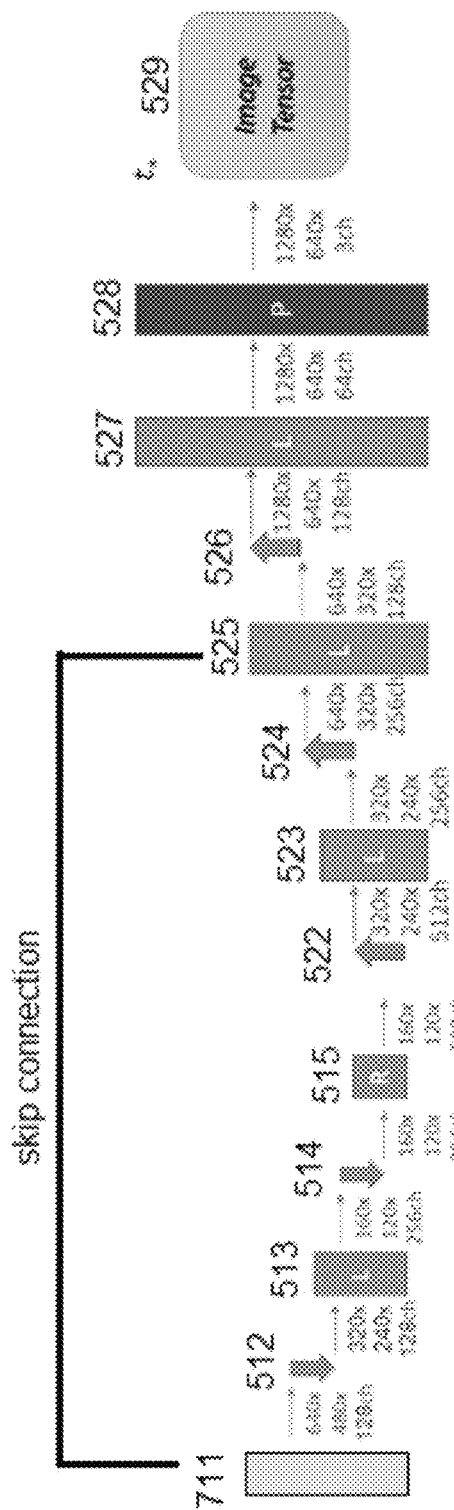
FIG. 7 illustrates an EFINet based network with skip connections, according to an embodiment of the disclosure.

Systems and methods according to embodiments of the disclosure perform full fusion between frames from a regular color image from a FBIS sensor and an event stream from a DVS sensor. Embodiments utilize the fact that a FBIS sensor has high spatial resolution but low temporal resolution, while a DVS sensor has low spatial resolution with high temporal resolution. The end result of the fusion is a color image or image stream having increased spatial and temporal resolution as compared to the two source streams. The fusion is made by a fully convolutional neural network or networks that combine input tensors made from RGB data and events data. The two sensors do not have same resolution and are not required to share the pixels.

Basic Assumptions

According to embodiments, minimal assumptions are made about the FBIS and DVS data streams.

1. There is no spatial disparity between the FBIS and DVS images.

Embodiments of the disclosure are agnostic to the method by which the two streams are combined. For example, it could be done by using a hybrid FBIS+DVS sensor, by using single aperture optics or by algorithmically aligning the streams before input to a network.

2. The input data streams are temporally synchronized.

According to an embodiment, the synchronization can be achieved by any suitable method, such as a hybrid sensor, external electronics or software methods.

Input Tensors

This section describes how the streams of the FBIS and the DVS are arranged into input tensors. The FBIS produces an output from which it is possible to extract color information; this could be a classical RGB configuration, but embodiments are not limited thereto, and in other embodiments, other color filter arrays is supported. FIG. 1 depicts two consecutive FBIS frames, image tensor 11 acquired from a FBIS sensor 10 at time $t_i$ and image tensor 12 acquired from the FBIS sensor 10 at time $t_{i+1}$, being concatenated 13 to into one 6 channel image input tensor 14, one channel for each color in each FBIS frame. In general, when a plurality of FBIS frames are concatenated into a single image input tensor, the individual FBIS frames are ordered by time.

According to an embodiment, to be able to utilize events from a DVS stream with a convolution neural network, the events need to be transformed into a fixed-size tensor presentation. The events acquired by the DVS occur asynchronously, and are placed into a set of temporal bins, where each bin corresponds to a preset time interval. A common choice is to quantize the events into a spatio-temporal voxel grid. The tensor E is defined by the following equations:

$$E(x_l, y_m, t_n) = \sum_{\substack{x_i=x_l \\ y_i=y_m}} p_i \max(0, 1 - |t_n - t_i^\#|), \quad (1)$$

$$\text{where } t_i^\# \triangleq \frac{B-1}{\Delta T}(t_i - t_0) \text{ and}$$

$$\Delta T = t_{N-1}^k - t_0^k,$$

where B is the number of temporal bins in the output tensor, the summation is over the time dimension of the tensor, and $p_i$ is the polarity of the event being summed. Thus the final value in the tensor $E(x_l, y_l, t_n)$ is equal to the polarity of the event (+1 or −1) times the temporal distance from the last time bin, as quantized by the B levels chosen.

FIG. 2 depicts three events tensors acquired form a DVS sensor being concatenated into a single event input tensor. According to an embodiment, the input event tensors are normalized such that the mean and standard deviation of the nonzero values in each tensor are 0 and 1, respectively. A desired output is a time point $t_*$ between two consecutive FBIS frames. Therefore, according to an embodiment, the event stream acquired from DVS sensor 20 can be split into two time ranges [$t_i$, $t_*$) and [$t_*$, $t_{i+1}$], and one additional range [$t_i$, $t_{i+1}$] for global normalization, and a tensor 21, 22, and 23 is respectively associated with each time range, as indicated in FIG. 2. The three tensors are concatenated 24 as shown in FIG. 2 into an event input tensor 25. The tensors in FIG. 2 are 3D tensors: 2-spatial dimensions for the pixel array and a $3^{rd}$ temporal dimension of B bins.

In an embodiment, referring now to FIG. 3, the generated event input tensor 25 from FIG. 2 and the image input tensor 14 from FIG. 1 may be pre-fused into a single input tensor 34. When dimension of the sensors are the same, the pre-fusion is naïve, as can be from FIG. 3. The combination or fusion is through a concatenation operation 33 as shown in FIG. 3. The precise order of the concatenation is unimportant from a technical point of view.

For sensors with different dimensions, the input tensors are pre-processed with separate convolutional layers. The higher dimension sensor input tensor is pooled down and the concatenation occurs when tensors have the same width and height. For example, a pre-fusion of a 640×480 DVS and a 1280×960 FBIS is shown in FIG. 4. In FIG. 4, the "H" block is a header convolutional layer with a 5×5 receptive area and a rectified linear unit, and the "L" block is 2 convolutional layers with a 3×3 receptive area and a rectified linear unit. Referring to FIG. 4, the first input is image input tensor 14. The H and L layers 41 and 42 increase the number of channels from 6 to 32 and then 64 channels, and max-pooling operation 43 downsamples the image resolution to 640×480 to match the spatial resolution of the event input tensor 25. Note that the increased number of channels are outputs of hidden layers in the neural network and do not have a well defined meaning, such as "color" with respect to the image input tensor, or "temporal" with respect to the event input tensor. Note also that the number of steps involved in transforming the image input tensor 14 is exemplary and non-limiting, and depends on both the size of the input image and the size of the desired input tensor. The second input is the event input tensor 25. The H and L layers 44 and 45 increase the number of channels from 15 to 32 and then 64 channels. The transformed image input tensor and event input tensor are the same size, and are concatenated at step 33 into an input tensor.

Network Architectures

Embodiments of the disclosure can support several network architectures. These architectures are trained by a simulator that presents desired output images to the network. Methods for training neural networks are known in the art. One such network architecture is a fully convolutional neural network (FCNN). This is a convolutional neural network without a "fully connected" layer at the exit; this means it preserves the space of the input and does not collapse it into some reduced space. For example, a classifier which is asked to decide if the picture is of a dog/cat/other collapses the image from the space of R[w×h] into the space of available classes. An FCNN generally preserves the dimensionality, up to scaling, perhaps, of the input, making it's output locally (in the spatial sense in an embodiment of the disclosure) instead of globally.

Another example is based on the UNet, referred to herein below as EFINet (Event Video Interpolation Net). A U-Net is a modified FCNN that was developed for biomedical image segmentation. Its architecture was modified and extended to work with fewer training images and to yield more precise segmentations. The main idea is to supplement a usual contracting network by successive expansion layers, where pooling operations are replaced by upsampling operators. Hence these layers increase the resolution of the output. In addition, successive convolutional layers can then learn to assemble a precise output based on this information. The contracting path is a typical convolutional neural network that includes repeated application of convolutions, each followed by a rectifed linear unit (ReLU) and a max pooling operation. During the contraction, the spatial information is reduced while feature information is increased. The expansive pathway combines the feature and spatial information through a sequence of up-convolutions and concatenations with high-resolution features from the contracting path. One important modification in U-Net is that there are a large number of feature channels in the upsampling part, which allow the network to propagate context information to higher resolution layers. As a consequence, the expansive path is more or less symmetric to the contracting part, and yields a u-shaped architecture. The network only uses the valid part of each convolution without any fully connected layer.

An exemplary, non-limiting EFINet example scheme for a 640×480 DVS and a 1280×960 FBIS in shown in FIGS. 5A and 5B. FIG. 6 is a legend for the components of FIGS. 5A and 5B. The "H" and "L" are the same as those in FIG. 4. The "P" block is a prediction layer, where the rectified liner unit is replaced by a sigmoid function, and the "R" block is a residual block that includes several convolutions followed by an activation that utilizes skip connections to jump over some layers. The down-arrow represents downsampling of the tensor width and height, usually by max/mean pooling, and the up-arrow represents up-sampling of the tensor height and width by interpolation. The networks shown in the examples are given for a specific combination of sensor sizes, but any combination of FBIS-DVS sensor sizes can, in principle, be supported. In addition, the number and types of steps in the figures are exemplary and non-limiting, and can vary depending on the sizes of the image and event input tensors and the size of the desired output tensor. Referring to FIG. 5A, the steps on the left side, up to and including the concatenation step 33, are that same as those in FIG. 4. The steps 511 to 515 decrease the spatial resolution while increasing the temporal resolution, which allows the network to look at features at larger scales. Increasing the number of channels adds more free parameters, which improves the network's ability to extract features from the input. Referring to FIG. 5B, the steps 521 to 528 increase the spatial resolution while decreasing the number of channels, and converts the features identified in the contracting path back into an image. The final output image tensor has high spatial resolution and 3 channels for RGB images, one for each color, or 1 channel for grayscale images.

Another network architecture according to an embodiment is an EFINet based network with skip connections, illustrated in FIG. 7. FIG. 7 is similar to FIGS. 5A and 5B, except for the addition of the skip connections 701, and the replacement of the first layer 611 with a recurrent neural network block 711. Skip connections are a standard method of transferring information inside a U-net architecture network. The first stages of the U-net, on the compressive path, view the image at full resolution, and information from that layer is transferred to the "expansion path", so that "resolution" is not lost. Skip connections cause the network to use more memory, however, the network is more accurate and has quicker convergence on training. Moreover, in other embodiments of these network architectures, the first convolution layer in every dimension in the contracting path of the EFINet can be replaced by a recurrent neural network block, such as LSTM or GRU. The recurrent blocks make the output more consistent.

Another network architecture according to an embodiment is a 'lite' EFINet with fewer layers and multiplication. An example of a lite EFINet with an input of FIG. 3 is shown in FIG. 8. Again, the number of steps shown in FIG. 8 is exemplary and non-limiting, and can vary depending on the input and the desired output. The input tensor 34 to FIG. 8 is the tensor output by FIG. 3. The network shown in FIG. 8 only changes the number of channels, while leaving the spatial resolution unchanged.

Figure 9A:
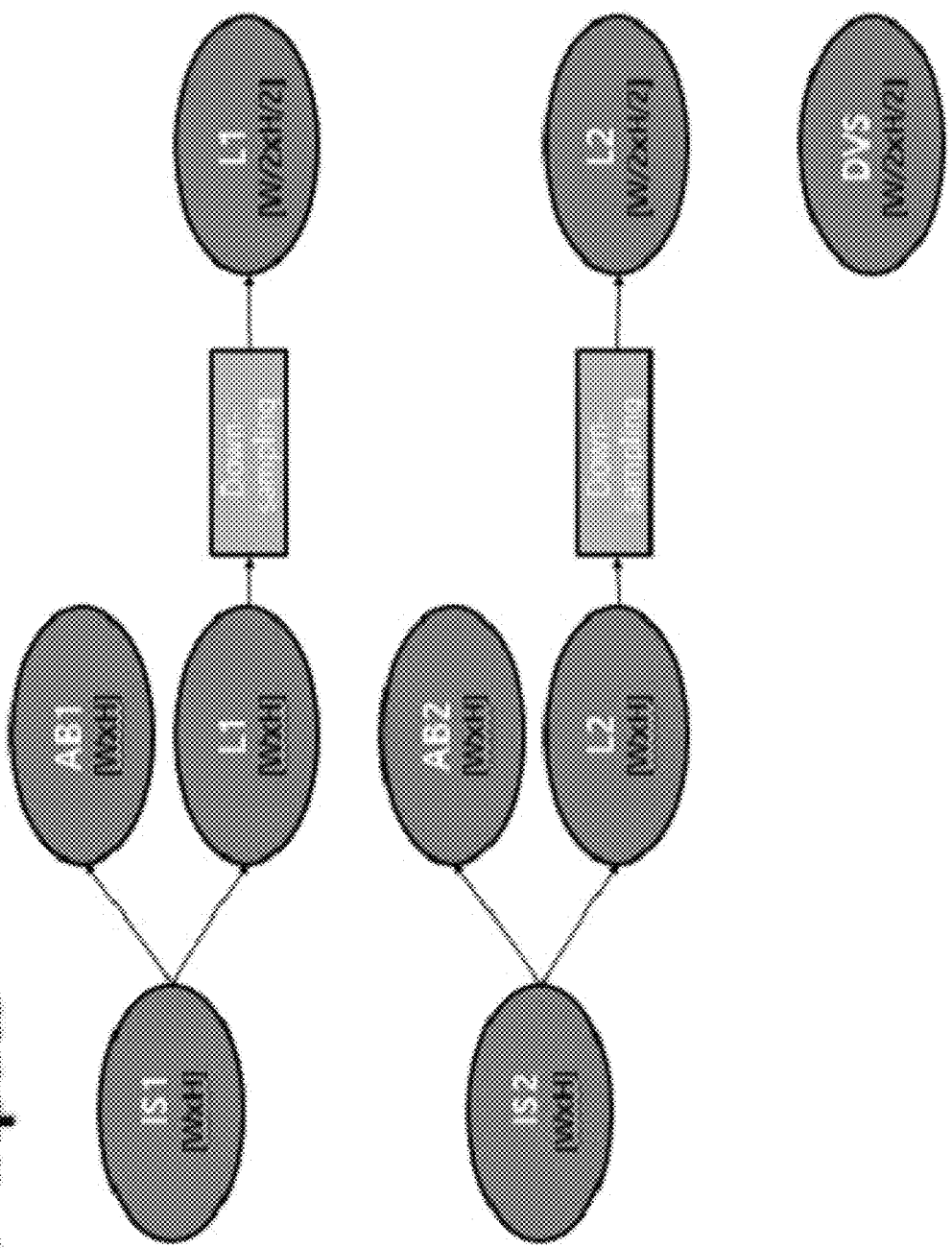
FIGS. 9A-9F illustrate a multi-phase full convolutional neural network in which every network phase is based on a UNet, according to an embodiment of the disclosure.
Figure 9B:
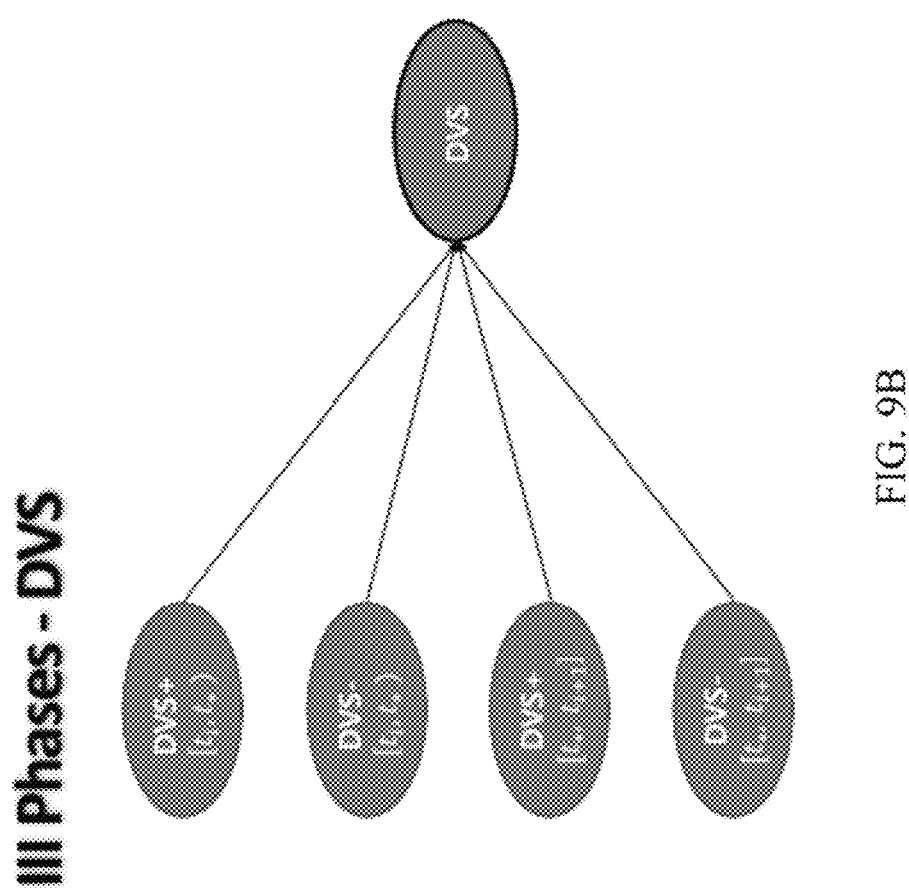
Figure 9C:
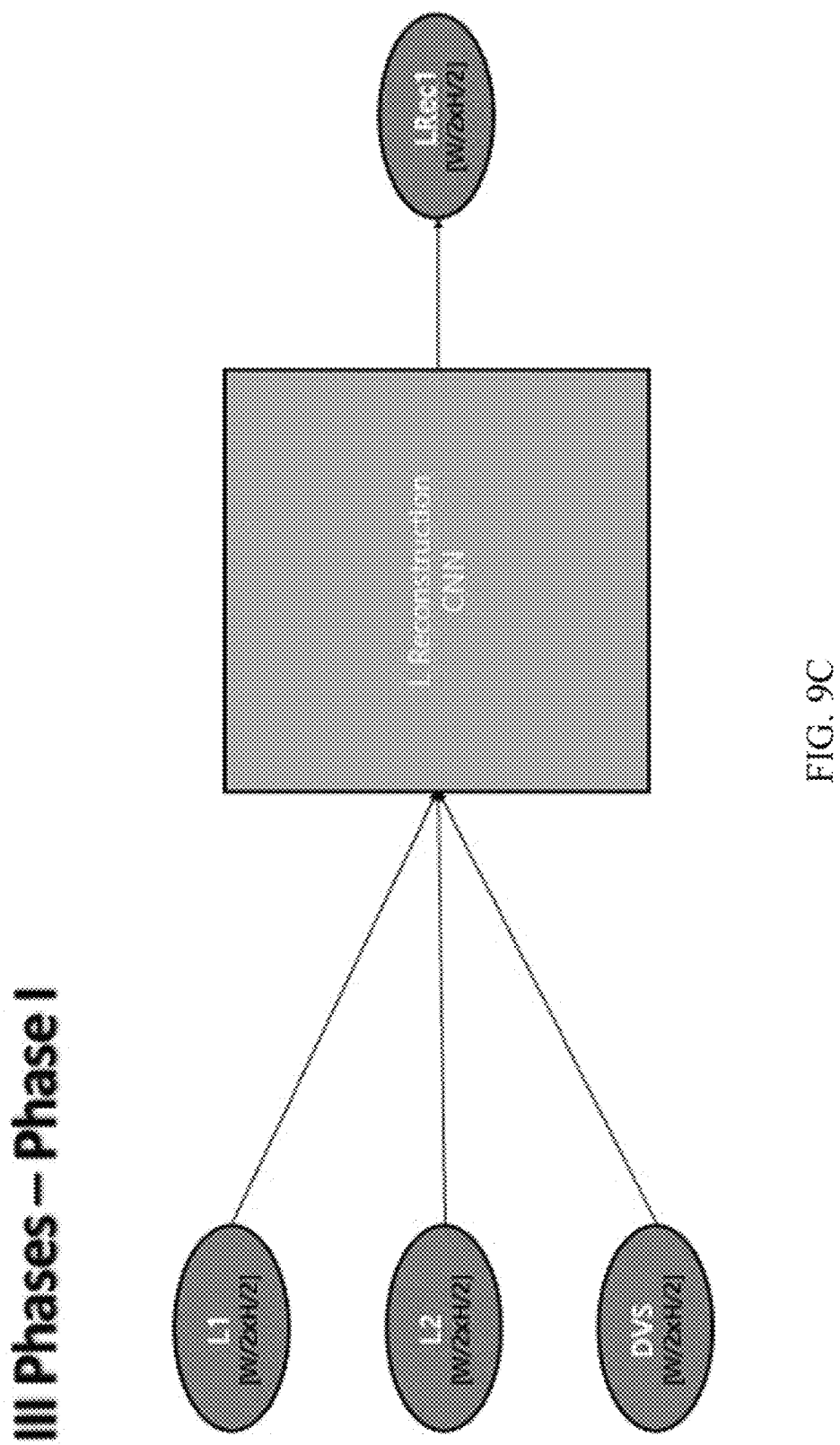
Figure 9D:
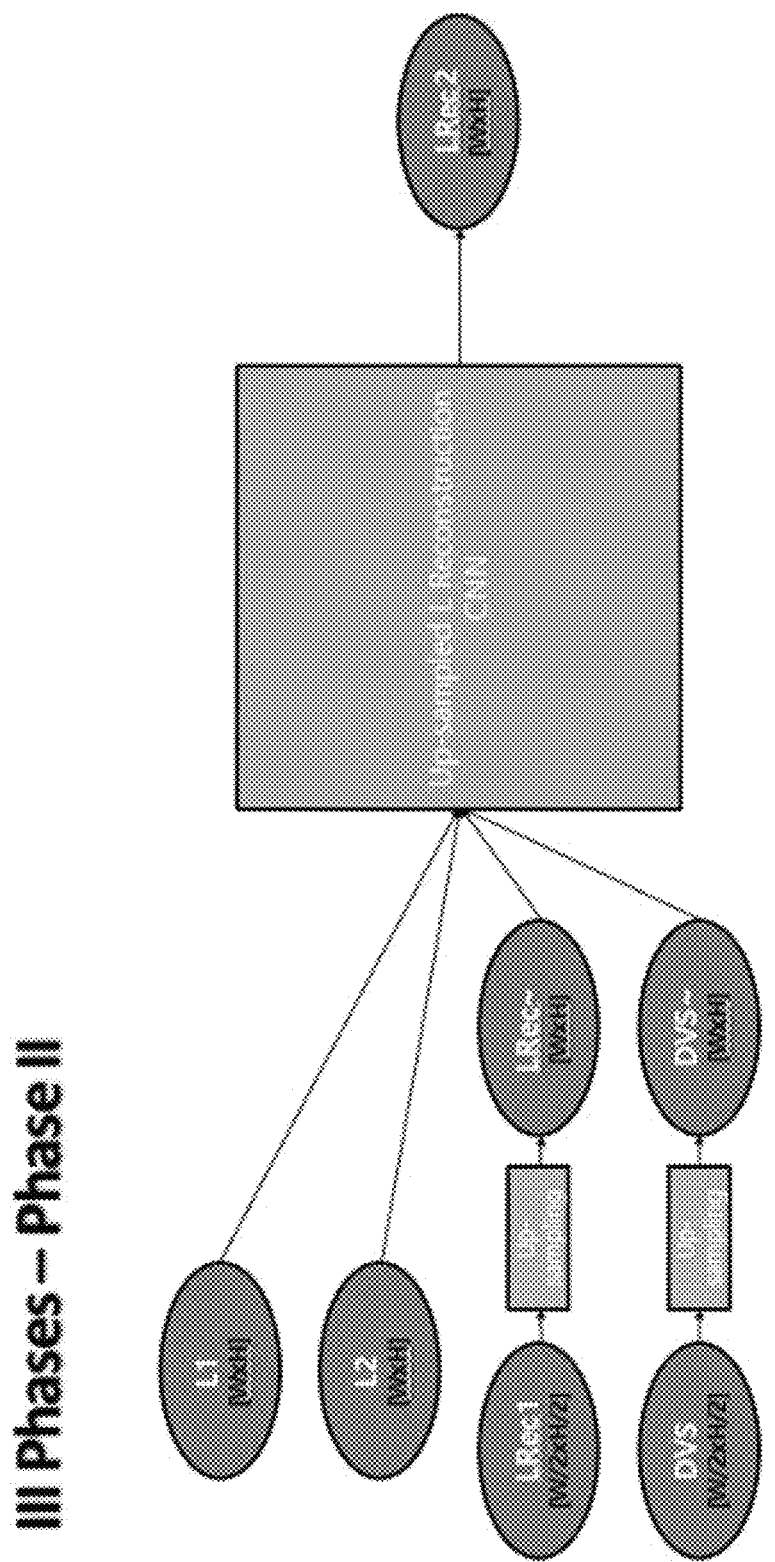
Figure 9E:
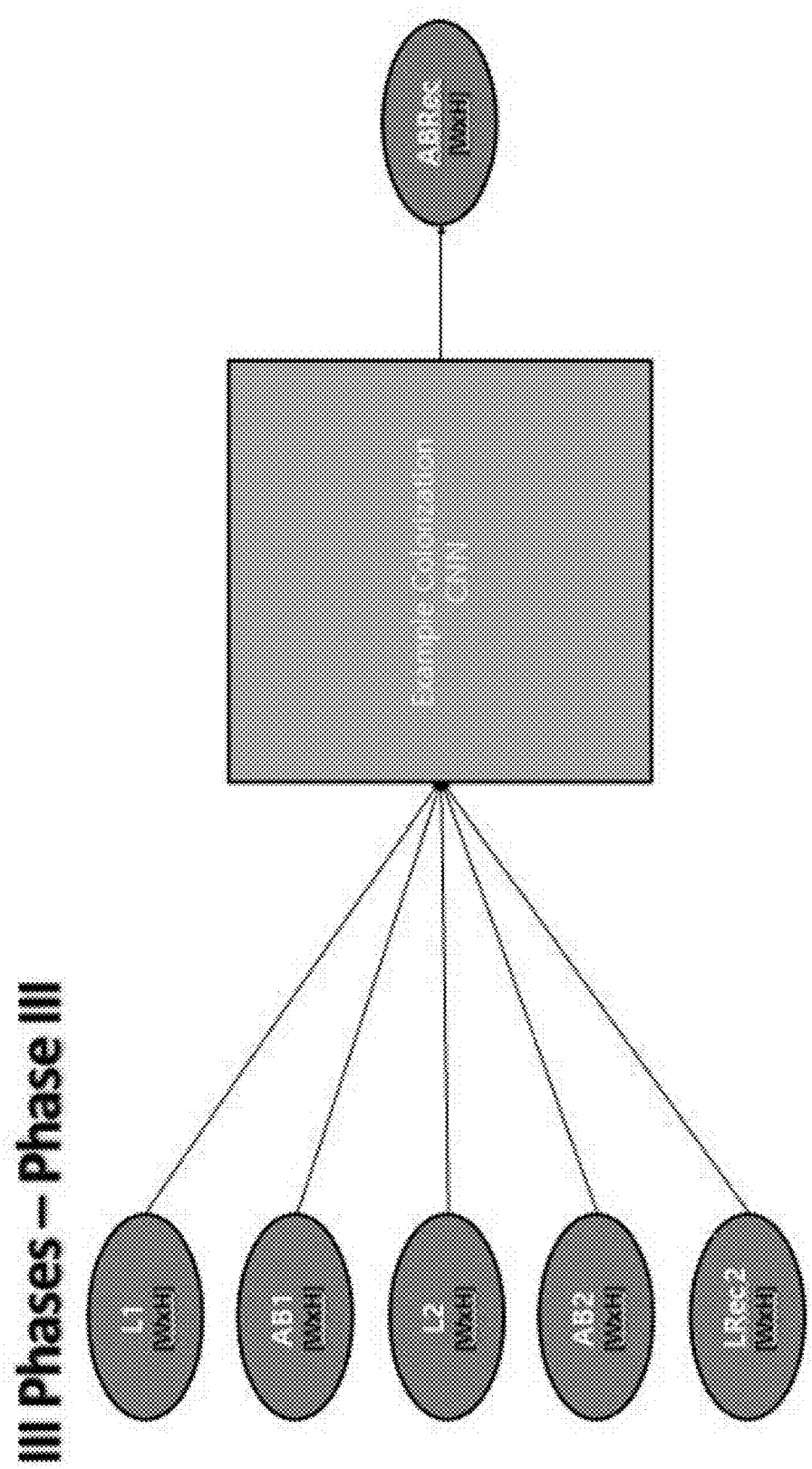
Figure 9F:
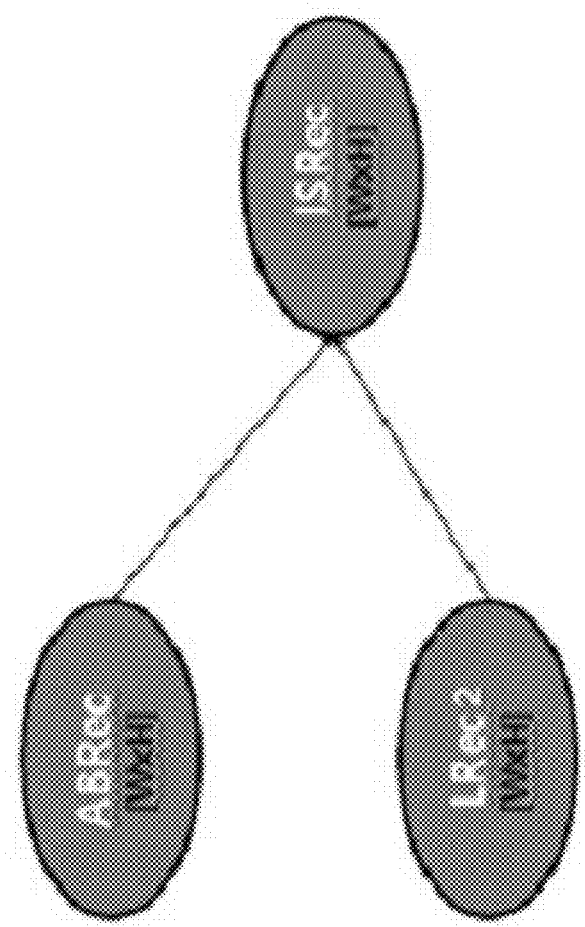

Another approach according to an embodiment for a network architecture is a multi-phase FCNN in which every network phase is based on a UNet, and is illustrated in FIGS. 9A-9F. A first phase is a network for high frame-rate grayscale reconstruction. A second phase is a network for deblurring color images in the original FBIS frame rate, and a third phase is a network for colorizing the high frame-rate grayscale reconstruct with the information of the deblurred color images. Referring to the figures, FIG. 9A depicts 2 input FBIS images FBIS1 and FBIS2 undergoing color space transformations from RGB to CIELAB color space, yielding, respectively, a luminance image L1, L2 for each input image, and an AB image AB1 and AB2 for each input image, where the luminance images and the AB images each have the same resolution as the input FBIS images. Note however, that the RGB to CIELAB color space transformation is exemplary and non-limiting, and FIG. 9A could depict other color space transformations, Each luminance image is then downsampled in each spatial dimension. An exemplary, non-limiting downsampling factor is 2. FIG. 9B depicts 4 inputs to a DVS sensor, where each input is an event stream. The inputs include (1) a stream of positive polarity events acquired between times $t_i$ and $t_*$, (2) a stream of positive negative events acquired between times $t_i$ and $t_*$, (3) a stream of positive polarity events acquired between times $t_*$ and $t_{i+1}$, and (4) a stream of negative polarity events acquired between times $t_*$ and $t_{i+1}$. FIG. 9C depicts the first network phase, in which the downsampled L1 and L2 inputs from FIG. 9A and the DVS input samples from FIG. 9B are processed by a U-net labeled L Reconstruction CNN which reconstructs a mixed grayscale frame LRec1 with the same resolution as the inputs L1, L2 and DVS. FIG. 9D depicts the second network phase. In this phase, the grayscale frame LRec1 output from phase I and the DVS input samples from FIG. 9B are each upsampled in each spatial dimension, yielding LRec~ and DVS~, respectively. An exemplary, non-limiting upsampling factor is 2. These upsampled outputs are then combined with tensors L1 and L2 from FIG. 9A in a U-net labeled Up-sampled L Reconstruction CNN, which yields a grayscale output LRec2 with the same resolution as the inputs L1, L2, LRec~ and DVS~. FIG. 9E depicts the third network phase, in which the outputs of the color transformation stage of FIG. 9A, tensors L1, AB1, L2, and AB2, are combined with the phase II output LRec2 by a colorization CNN, yielding an output tensor ABRec in the CIELAB color space. FIG. 9F shows the ABRec output from phase III being combined with the LRec2 output from phase I, to yield an output tensor ISRec in the RGB color space. Note that the color space transformation of FIG. 9F is the inverse of that of FIG. 9A.

The Whole System

Figure 10:
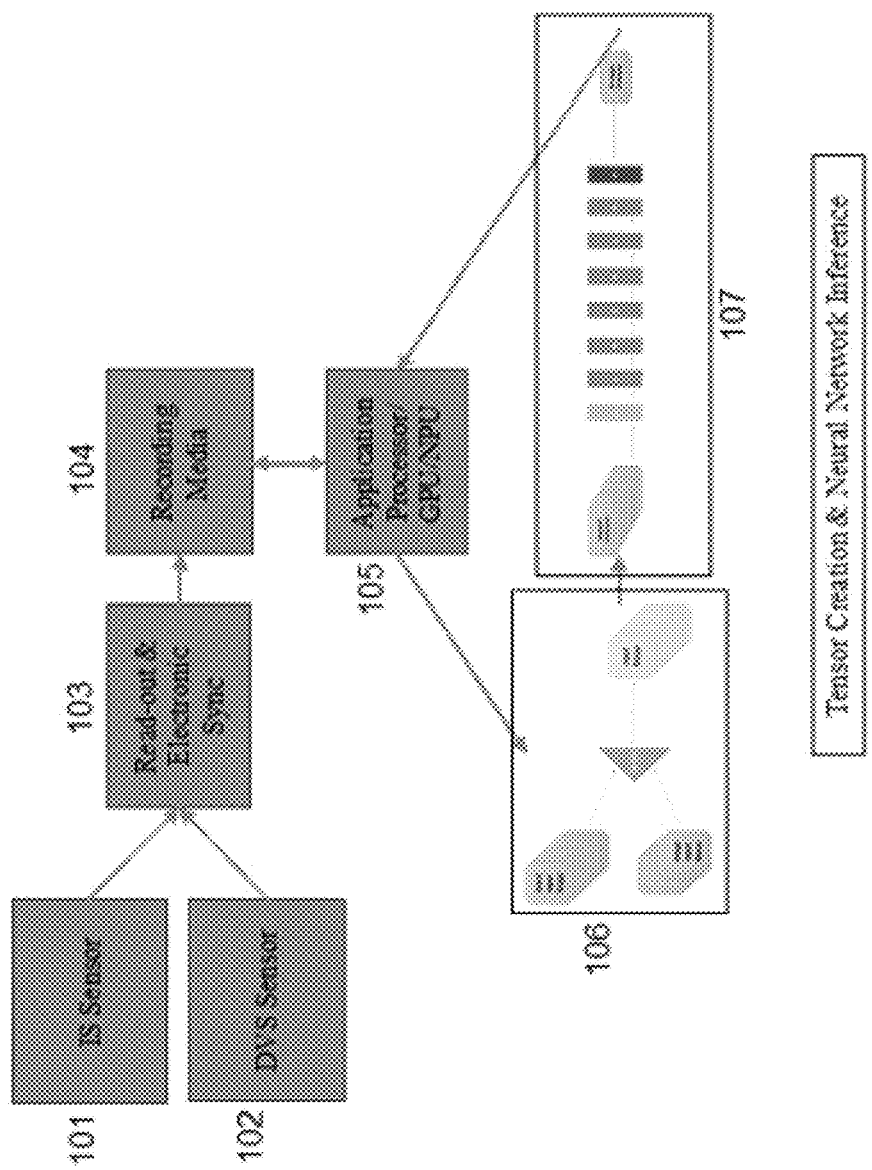
FIG. 10 illustrates a whole tensor creation and neural network inference system according to an embodiment of the disclosure.

FIG. 10 illustrates a whole tensor creation and neural network inference system according to an embodiment of the disclosure. Referring now to FIG. 10, a tensor creation and neural network inference system includes a FBIS sensor 101, a DVS sensor 102, a read-out and electronic synchronization module 103, a recording media module 104, and an application processor 105. The application processor includes a prefusion system 106 as shown in FIG. 3, and a lite EFINet 107 as shown in FIG. 8. The read-out and electronic synchronization module 103 is a circuit that synchronizes the outputs of the FBIS/DVS sensors so that they have a common reference time. The recording media module 104 is an assumed media, such as the memory of a smart phone, onto which the data is recorded, and the application processor 105, which can be a GPU or an NPU, is a processing unit that actually runs the neural network. Blocks 106 and 107 have already been described with respect to FIGS. 3 and 8, respectively. FIG. 10 depicts how a NN according to an embodiment fits into the scope of the larger system. Note that the depiction of blocks 106 and 107 by FIGS. 3 and 8 is for ease of illustration, and is exemplary and non-limiting. For example, block 106 could also be implemented by the pre-fusion system shown in FIG. 4, and block 107 could be implemented by the EFINet example scheme of FIGS. 5A and 5B.

Effects

According to an embodiment, the high temporal resolution of an event camera helps overcome the strong motion interpolation issues of conventional and deep approaches. Furthermore, the fact that grayscale frames can be reconstructed only from an event camera helps overcome occlusions interpolation issues of conventional and deep approaches by including data that is simply not present when attempting to perform interpolation on low frequency sampled data.

In light of these features, a system according to embodiment of the disclosure can be used for a variety of tasks:
1. Performing very high-speed (~2000 FPS) video recording using a regular FBIS sensor combined with a DVS sensor.
2. Performing deblurring and image quality improvement of still images in low-light conditions and fast moving scene.
3. Compressing video streams for low bandwidth use-cases, such as video streaming on low BW connections.

EXAMPLES

Figure 12:
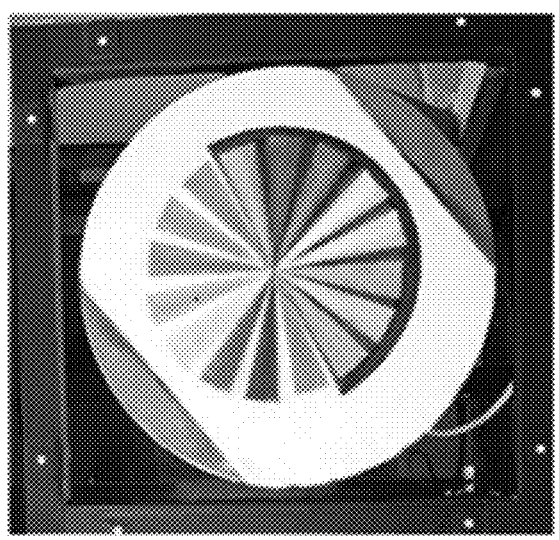

FIGS. 11 and 12 display examples of embodiments of the disclosure that operates on a synthetic video sequence.

FIG. 11 illustrates a first example according to an embodiment. Referring to FIG. 11, the top row shows spinning wheel images that are "ground truth" frames from a high-speed camera at times $t_i$, $t_*$ and $t_{i+1}$, and the bottom row shows the same frames with the intervening events, captured in parallel with a DVS camera.

A second example according to an embodiment, shown in FIG. 12, illustrates the reconstruction of a frame at time $t_*$, from input data of frames $t_i$, $t_{i+1}$ and the intervening events.

System Implementations

It is to be understood that embodiments of the present disclosure can be implemented in various forms of hardware, software, firmware, special purpose processes, or a combination thereof. In one embodiment, the present disclosure can be implemented in hardware as an application-specific integrated circuit (ASIC), or as a field programmable gate array (FPGA). In another embodiment, the present disclosure can be implemented in software as an application program tangible embodied on a computer readable program storage device. The application program can be uploaded to, and executed by, a machine comprising any suitable architecture.

Figure 13:
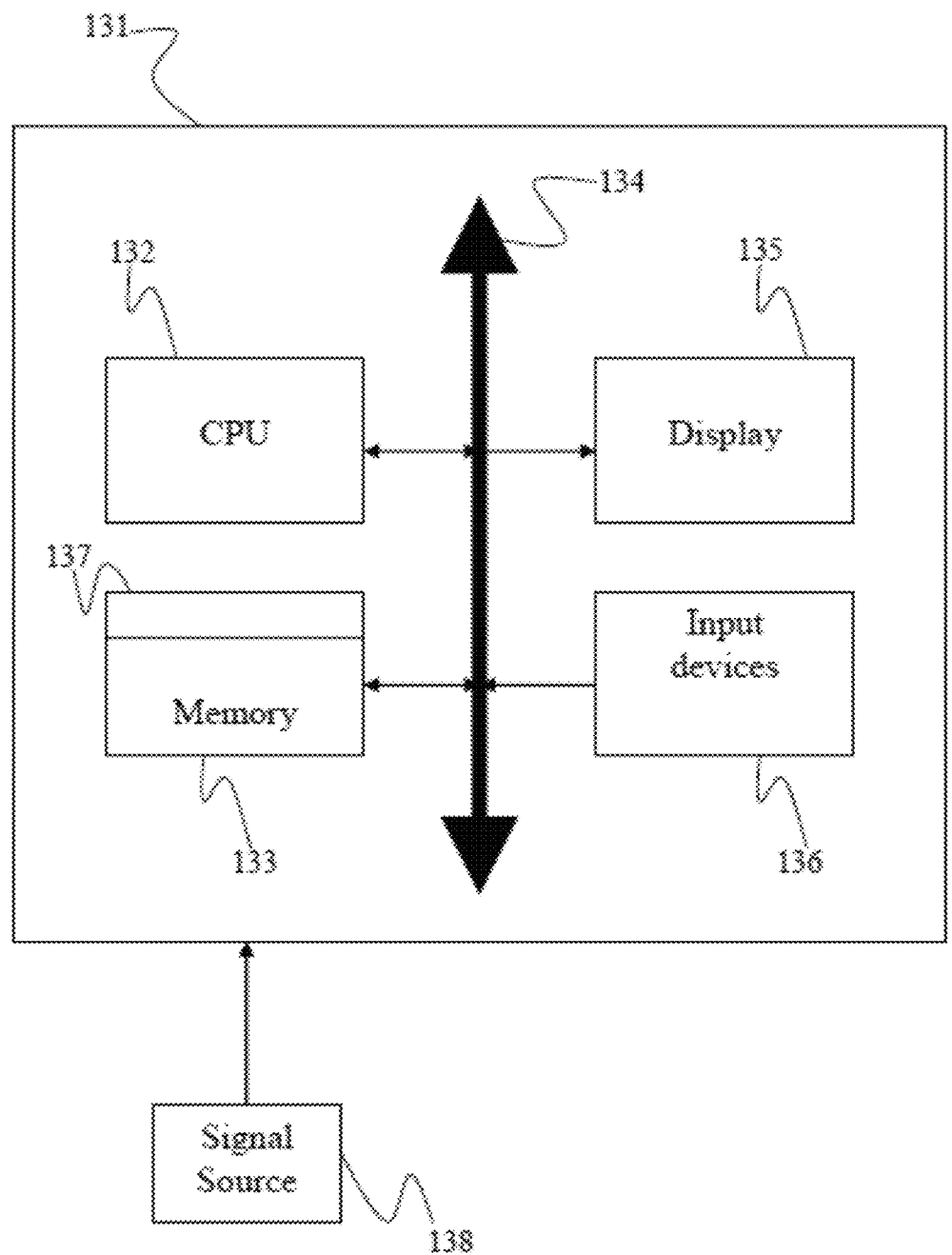
FIG. 13 is a block diagram of a computer system that implements a full fusion pipeline between color images from a CMOS image sensor (CIS) and an event stream from a dynamic vision sensor (DVS), according to an embodiment of the disclosure.

FIG. 13 is a block diagram of a system for performing data warping, according to an embodiment of the disclosure. Referring now to FIG. 13, a computer system 131 for implementing the present invention can comprise, inter alia, a central processing unit (CPU) or controller 132, a memory 13 and an input/output (I/O) interface 134. The computer system 131 is generally coupled through the I/O interface 134 to a display 135 and various input devices 136 such as a mouse and a keyboard. The support circuits can include circuits such as cache, power supplies, clock circuits, and a communication bus. The memory 133 can include random access memory (RAM), read only memory (ROM), disk drive, tape drive, etc., or a combinations thereof. The present disclosure can be implemented as a routine 137 that is stored in memory 133 and executed by the CPU or controller 132 to process the signal from the signal source 138. As such, the computer system 131 is a general purpose computer system that becomes a specific purpose computer system when executing the routine 137 of the present invention. Alternatively, as described above, embodiments of the present disclosure can be implemented as an ASIC or FPGA 137 that is in signal communication with the CPU or controller 132 to process the signal from the signal source 138.

The computer system 131 also includes an operating system and micro instruction code. The various processes and functions described herein can either be part of the micro instruction code or part of the application program (or combination thereof) which is executed via the operating system. In addition, various other peripheral devices can be connected to the computer platform such as an additional data storage device and a printing device.

It is to be further understood that, because some of the constituent system components and method steps depicted in the accompanying figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

While the present invention has been described in detail with reference to exemplary embodiments, those skilled in the art will appreciate that various modifications and substitutions can be made thereto without departing from the spirit and scope of the invention as set forth in the appended claims.

What is claimed is:

1. A method of fusing frame based image sensors (FBIS) images with dynamic vision sensor (DVS) event data, comprising the steps of:
   concatenating a plurality of image tensors, each acquired from a FBIS at a separate time, into a single image input tensor, wherein each image tensor is a 3D tensor, with 2 spatial dimensions and a third dimension that is initially a color dimension;
   concatenating a plurality of event tensors, each acquired from a DVS at a separate time, into a single event input tensor, where each event tensor is a 3D tensor with 2 spatial dimensions and a third dimension that is initially a temporal dimension;
   concatenating the event input tensor and the image input tensor so that a single intermediate tensor containing data from both the image input tensor and the event input tensor is generated;
   processing the single intermediate tensor with a fully convolutional neural network (FCNN), wherein in a contracting path of the FCNN, a number of channels is increased, and in an expansion path of the FCNN, the number of channels is decreased; and combining channels so that an output image tensor is generated with a reduced number of channels.

2. The method of claim 1, wherein the image tensors are ordered by time in the image input tensor, and wherein the event input tensor is normalized such that the mean and standard deviation of nonzero values in the input event tensor are 0 and 1, respectively.

3. The method of claim 1, wherein concatenating the plurality of event tensors comprises concatenating, for each event time point between consecutive FBIS frames,
a first event stream tensor,
a second event stream tensor, and
a third event stream tensor into an event input tensor,
wherein each of the first event stream tensor, the second event stream tensor, and the third event stream tensor is a 3D tensor with 2 spatial dimensions and a third dimension that is initially a temporal dimension.

4. The method of claim 3, wherein, for an image input tensor that combines a first FBIS frame at time $t_i$ and a second FBIS frame at time $t_{i+1}$,
the first event stream tensor for a time point $t_*$ between the first and second FBIS frames includes events acquired in the time range $[t_i, t_*)$,
the second event stream tensor for a time point $t_*$ between the first and second FBIS frames includes events acquired in the time range $[t_*, t_{i+1}]$, and
the third event stream tensor for a time point $t_*$ between the first and second FBIS frames includes events acquired in the time range $[t_i, t_{i+1}]$, and
the method further comprises using the third event stream for global normalization.

5. The method of claim 1, wherein concatenating the event input tensor and the image input tensor into a single input tensor comprises, when the spatial dimensions of the image input tensor differ from the spatial dimensions of the event input tensor:
processing the image input tensor in a neural network to increase a number of channels in the third dimension and resampling the spatial dimensions of the image input tensor to match the spatial dimension of the event input tensor wherein a processed image input tensor is generated;
processing the event input tensor in a net network to increase a number of channels in the third dimension to match the number of channels in the third dimension of the image input tensor wherein a processed event input tensor is generated; and
concatenating the processed image input tensor and the processed event input tensor into a single input tensor.

6. The method of claim 1, wherein processing the single intermediate tensor with a FCNN comprises
decreasing a spatial resolution of the single intermediate tensor in a contracting path of the FCNN, and increasing the spatial resolution of the single intermediate tensor in an expansion path of the FCNN.

7. The method of claim 6, wherein the FCNN includes skip connection between network layers in the contracting path and network layers in the expansion path, and a first convolution layer in each dimension in the contracting path is replaced by a recurrent neural network.

8. The method of claim 1, wherein processing the single intermediate tensor with a FCNN comprises:
transforming a color space of a first FBIS image and a second FBIS image from a first color space to a second color space, so that a first and a second luminance image are generated for each input image, and a first and a second image are generated for each input image, and downsampling each luminance image in each spatial dimension;
processing the downsampled first and second luminance images and DVS input samples by a first U-net so that a first mixed grayscale frame is generated with a same spatial resolution as the downsampled first and second luminance images and the DVS input samples;
upsampling the first mixed grayscale frame and the DVS input samples in each spatial dimension and combining the upsampled first mixed grayscale frame and upsampled DVS input samples with the first and second luminance images in a second U-net so that a second mixed grayscale frame is generated with a same spatial resolution as the upsampled first mixed grayscale frame, the upsampled DVS input samples, and the first and second luminance images;
combining the second mixed grayscale frame with the first and second luminance images and the first and the second images in a third U-Net so that an output tensor in the second color space is generated; and
transforming the color space of the output tensor from the second color space to the first color space.

9. The method of claim 1, wherein the FCNN is a U-Net.

10. A system for fusing frame based image sensors (FBIS) images with dynamic vision sensor (DVS) event data, comprising:
a FBIS sensor;
a DVS sensor;
a read-out and electronic synchronization module that synchronizes images acquired from the FBIS sensor with event data acquired from the DVS sensor so that they have a common reference time;
a recording media module that records the outputs of the FBIS and DVS sensors; and
an application processor that executes a neural network that is configured to fuse images acquired from the FBIS images with event data acquired from the DVS into a single intermediate tensor,
wherein the neural network comprises a fully convolutional neural network (FCNN) that processes the single intermediate tensor, wherein in a contracting path of the FCNN, a number of channels is increased, and in an expansion path of the FCNN, the number of channels is decreased, and combines channels so that an output image tensor is generated, wherein the number of channels is reduced to correspond to a number of colors.

11. The system of claim 10, wherein the neural network further comprises:
a pre-fusion system that is configured to
concatenate a plurality of images acquired from the FBIS at separate times, into a single image input tensor,
concatenate, for each event time point between consecutive FBIS frames, a first event stream tensor, a second event stream tensor, and a third event stream tensor into an event input tensor, and
fuse the image input tensor and the event input tensor into the single intermediate tensor.

12. A non-transitory program storage device readable by a computer, tangibly embodying a program of instructions executed by the computer to perform a method for fusing frame based image sensors (FBIS) images with dynamic vision sensor (DVS) event data, the method comprising:
concatenating an event input tensor formed by concatenating a plurality of event tensors acquired from a DVS at separate times and an image input tensor formed by concatenating a plurality of image tensors acquired from a FBIS at separate times, into a single intermediate tensor that contains data from both the image input tensor and the event input tensor,
wherein each image tensor is a 3D tensor with 2 spatial dimensions and a third dimension that is initially a color dimension,
wherein the image tensors are ordered by time in the image input tensor, and each event tensor is a 3D tensor with 2 spatial dimensions and a third dimension that is initially a temporal dimension,
wherein the input event tensor is normalized such that the mean and standard deviation of nonzero values in the input event tensor are 0 and 1, respectively; and
processing the single intermediate tensor with a fully convolutional neural network (FCNN), wherein in a contracting path of the FCNN, a number of channels is increased, and in an expansion path of the FCNN, the number of channels is decreased.

13. The computer readable program storage device of claim 12, wherein the method further comprises combining channels so that an output image tensor is generated with a reduced number of channels.

14. The computer readable program storage device of claim 12, wherein concatenating the plurality of event tensors comprises concatenating, for each event time point between consecutive FBIS frames,
a first event stream tensor,
a second event stream tensor, and
a third event stream tensor into an event input tensor,
wherein each of the first event stream tensor, the second event stream tensor, and the third event stream tensor is a 3D tensor with 2 spatial dimensions and a third dimension that is initially a temporal dimension.

15. The computer readable program storage device of claim 14, wherein, for an image input tensor that combines a first FBIS frame at time $t_i$ and a second FBIS frame at time $t_{i+1}$,
the first event stream tensor for a time point $t_*$ between the first and second FBIS frames includes events acquired in the time range $[t_i, t_*]$,
the second event stream tensor for a time point $t_*$ between the first and second FBIS frames includes events acquired in the time range $[t_*, t_{i+1}]$, and
the third event stream tensor for a time point $t_*$ between the first and second FBIS frames includes events acquired in the time range $[t_i, t_{i+1}]$, and
the method further comprises using the third event stream for global normalization.

16. The computer readable program storage device of claim 12, wherein concatenating the event input tensor and the image input tensor into a single intermediate tensor comprises, when the spatial dimensions of the image input tensor differ from the spatial dimensions of the event input tensor:
processing the image input tensor in a neural network to increase a number of channels in the third dimension and resampling the spatial dimensions of the image input tensor to match the spatial dimension of the event input tensor so that a processed image input tensor is generated;
processing the event input tensor in a neural network to increase a number of channels in the third dimension to match the number of channels in the third dimension of the image input tensor so that a processed event input tensor is generated; and
concatenating the processed image input tensor and the processed event input tensor into the single intermediate tensor.

17. The computer readable program storage device of claim 12, wherein processing the single intermediate tensor with a FCNN comprises
decreasing a spatial resolution of the single intermediate tensor in a contracting path of the FCNN, and increasing, the spatial resolution of the single intermediate tensor in an expansion path of the FCNN.

18. The computer readable program storage device of claim 17, wherein the FCNN includes skip connection between network layers in the contracting path and network layers in the expansion path, and a first convolution layer in each dimension in the contracting path is replaced by a recurrent neural network.

19. The computer readable program storage device of claim 12, wherein processing the single intermediate tensor with a FCNN comprises:
transforming a color space of a first FBIS image and a second FBIS image from a first color space to a second color space, wherein a first and a second luminance images are generated for each input image, and a first and a second image are generated for each input image, and downsampling each luminance image in each spatial dimension;
processing the downsampled first and second luminance images and DVS input samples by a first U-net so that a first mixed grayscale frame is generated with a same spatial resolution as the downsampled first and second luminance images and the DVS input samples;
upsampling the first mixed grayscale frame and the DVS input samples in each spatial dimension and combining the upsampled first mixed grayscale frame and upsampled DVS input samples with the first and the second luminance images in a second U-net so that a second mixed grayscale frame is generated with a same spatial resolution as the upsampled first mixed grayscale frame, the upsampled DVS input samples, and the first and second luminance images;
combining the second mixed grayscale frame with the first and the second luminance images and the first and second images in a third U-Net so that an output tensor in the second color space is generated; and
transforming the color space of the output tensor from the second color space to the first color space.

20. The computer readable program storage device of claim 12, wherein the FCNN is a U-Net.

* * * * *